United States Patent
Yamanaka et al.

(10) Patent No.: US 10,788,780 B2
(45) Date of Patent: Sep. 29, 2020

(54) IMAGE FORMING APPARATUS AND CORRECTION CONTROL PROGRAM

(71) Applicant: Konica Minolta, Inc., Chiyoda-ku, Tokyo (JP)

(72) Inventors: Daiki Yamanaka, Sagamihara (JP); Takaaki Kooriya, Hachioji (JP); Hiroshige Kidera, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/054,645

(22) Filed: Aug. 3, 2018

(65) Prior Publication Data

US 2019/0064721 A1 Feb. 28, 2019

(30) Foreign Application Priority Data

Aug. 24, 2017 (JP) ................. 2017-161016

(51) Int. Cl.
*G03G 15/00* (2006.01)
*H04N 1/60* (2006.01)
*G03G 15/10* (2006.01)
*G03G 15/01* (2006.01)

(52) U.S. Cl.
CPC ....... *G03G 15/556* (2013.01); *G03G 15/0121* (2013.01); *G03G 15/105* (2013.01); *G03G 15/5041* (2013.01); *G03G 15/5062* (2013.01); *H04N 1/60* (2013.01); *H04N 1/6036* (2013.01); *H04N 1/6047* (2013.01)

(58) Field of Classification Search
None
See application file for complete search history.

(56) References Cited

U.S. PATENT DOCUMENTS

| | | | | |
|---|---|---|---|---|
| 4,719,506 A | * | 1/1988 | Van Buren | H04N 1/60 358/506 |
| 5,579,090 A | * | 11/1996 | Sasanuma | H04N 1/4078 358/521 |
| 6,097,501 A | * | 8/2000 | Hayashi | H04N 1/62 358/1.9 |
| 6,271,934 B1 | * | 8/2001 | Hayashi | H04N 1/407 358/1.9 |
| 6,324,356 B1 | * | 11/2001 | Inoue | G03G 15/0121 358/1.9 |

(Continued)

FOREIGN PATENT DOCUMENTS

JP 2008-224845 9/2008

*Primary Examiner* — Anh-Vinh T Nguyen
(74) *Attorney, Agent, or Firm* — Squire Patton Boggs (US) LLP (57) ABSTRACT

An image forming apparatus includes: an image former that forms an image, which is desired by a user and different from a predetermined pattern, on a sheet; an output information detector that detects output information on a first image formed on a first sheet by the image former; and a hardware processor that: acquires an correction amount of a third image, which is formed on a third sheet after the first sheet and a second sheet, according to a detection result of the first image by the output information detector and image information on a second image formed on the second sheet after the first sheet by the image former; and controls the image former so as to correct the third image based on the correction amount acquired by the hardware processor.

9 Claims, 6 Drawing Sheets (56) References Cited

U.S. PATENT DOCUMENTS

| | | | |
|---|---|---|---|
| 2004/0143710 A1* | 7/2004 | Walmsley | B41J 2/04508 |
| | | | 711/144 |
| 2004/0174570 A1* | 9/2004 | Plunkett | B41J 2/04528 |
| | | | 358/3.13 |
| 2005/0141920 A1* | 6/2005 | Sato | G03G 15/5008 |
| | | | 399/167 |
| 2008/0124115 A1* | 5/2008 | Oki | G03G 15/011 |
| | | | 399/74 |
| 2011/0001992 A1* | 1/2011 | Kajihara | H04N 1/6008 |
| | | | 358/1.9 |
| 2014/0362416 A1* | 12/2014 | Kakutani | H04N 1/405 |
| | | | 358/3.24 |
| 2015/0241621 A1* | 8/2015 | Inui | G02B 6/0051 |
| | | | 349/65 |
| 2016/0212303 A1* | 7/2016 | Tsuchiya | H04N 1/6005 |
| 2016/0269598 A1* | 9/2016 | Hayashi | H04N 1/6036 |
| 2017/0052468 A1* | 2/2017 | Omura | G03G 15/5058 |
| 2017/0131671 A1* | 5/2017 | Nishimura | G03G 15/5062 |
| 2017/0223229 A1* | 8/2017 | Shojaku | H04N 1/6036 |
| 2019/0327387 A1* | 10/2019 | Hashimoto | H04N 1/6055 |
| 2020/0033773 A1* | 1/2020 | Kasuya | G03G 15/2039 |

\* cited by examiner

| SHEET | COLOR | PROVISIONAL CORRECTION AMOUNT [V] | COLOR INFORMATION | PIXEL POSITION | RELIABILITY | APPLICATION RATIO | CORRECTION AMOUNT [V] | CORRECTION-APPLIED SHEET |
|---|---|---|---|---|---|---|---|---|
| S1 | Y | 120 | ESTIMATED | CENTER | 50% | 50% | 60 | S4 |
| S2 | Y | 100 | ACTUAL MEASUREMENT | CENTER | 80% | 100% | 40 | S5 |

FIG. 6B

| SHEET | COLOR | PROVISIONAL CORRECTION AMOUNT [V] | COLOR INFORMATION | PIXEL POSITION | RELIABILITY | APPLICATION RATIO | CORRECTION AMOUNT [V] | CORRECTION-APPLIED SHEET |
|---|---|---|---|---|---|---|---|---|
| S1 | M | 100 | ACTUAL MEASUREMENT | CENTER | 80% | 80% | 80 | S4 |
| S2 | M | 60 | ACTUAL MEASUREMENT | CENTER | 90% | 100% | 10 | S5 |
| S2 | M | 120 | ACTUAL MEASUREMENT | CENTER | | | | S5 |

FIG. 6C

| SHEET | COLOR | PROVISIONAL CORRECTION AMOUNT [V] | COLOR INFORMATION | PIXEL POSITION | RELIABILITY | APPLICATION RATIO | CORRECTION AMOUNT [V] | CORRECTION-APPLIED SHEET |
|---|---|---|---|---|---|---|---|---|
| S1 | C | 100 | ACTUAL MEASUREMENT | CENTER | 90% | 90% | 99 | S4 |
| S1 | C | 120 | ACTUAL MEASUREMENT | CENTER | | | | S4 |
| S2 | C | 120 | ACTUAL MEASUREMENT | LEFT END | 95% | 100% | 1 | S5 |
| S2 | C | 80 | ACTUAL MEASUREMENT | RIGHT END | | | | S5 |

FIG. 6D

| SHEET | COLOR | PROVISIONAL CORRECTION AMOUNT [V] | COLOR INFORMATION | PIXEL POSITION | RELIABILITY | APPLICATION RATIO | CORRECTION AMOUNT [V] | CORRECTION-APPLIED SHEET |
|---|---|---|---|---|---|---|---|---|
| S1 | K | 50 | ACTUAL MEASUREMENT | CENTER | 80% | 100% | 50 | S4 |
| S2 | K | 70 | ESTIMATED | CENTER | 50% | 0% | 0 | S5 |

FIG. 6E

| SHEET | COLOR | PROVISIONAL CORRECTION AMOUNT [V] | COLOR INFORMATION | PIXEL POSITION | RELIABILITY | APPLICATION RATIO | CORRECTION AMOUNT [V] | CORRECTION-APPLIED SHEET |
|---|---|---|---|---|---|---|---|---|
| S1 | Y | 100 | ESTIMATED | CENTER | 50% | 50% | 50 | S4 |
| S2 | Y | 110 | ESTIMATED | CENTER | 50% | 50% | 30 | S5 |
| S3 | Y | 70 | ACTUAL MEASUREMENT | CENTER | 80% | 100% | -10 | S6 |

FIG. 7

IMAGE FORMING APPARATUS AND CORRECTION CONTROL PROGRAM

The entire disclosure of Japanese patent Application No. 2017-161016, filed on Aug. 24, 2017, is incorporated herein by reference in its entirety.

BACKGROUND

Technological Field

The present invention relates to an image forming apparatus and a correction control program.

Description of the Related Art

Generally, an image forming apparatus (printer, copying machine, facsimile or the like) utilizing an electrophotographic process technology irradiates (exposes) a charged photosensitive drum (image carrier) with laser light based on image data to form an electrostatic latent image. Then, toner is supplied to the photosensitive drum, on which the electrostatic latent image is formed, from a developing apparatus, thereby visualizing the electrostatic latent image to form a toner image. Moreover, after this toner image is directly or indirectly transferred onto a sheet, the toner image is formed on the sheet by heating and pressurizing with a fixing nip to fix.

The output image formed on the sheet preferably coincides with the input image inputted in the image forming apparatus, but there are cases where the output image and the input image do not coincide with each other depending on the surrounding environment, the type of sheet, and the durable conditions. Therefore, there has been known a technology in which, for example, a print job is interrupted at a predetermined timing, a patch image is formed, and the density of the patch image is detected to correct the output image in the image forming apparatus.

For example, JP 2008-224845 discloses a technology in which the number of patch images for performing correction according to variation amounts of factors influencing density variation of an output image is determined, and the output image is corrected based on the patch images.

However, when the patch images are formed in order to correct an output image, there have been problems that extra toner is consumed as well as the productivity is reduced due to the necessity of the interruption of the print job. Note that it is necessary to form a patch image in a blank area on a sheet in order to prevent the print job from being interrupted, but a patch image cannot be formed if there is no blank area on the sheet.

Figure 1:
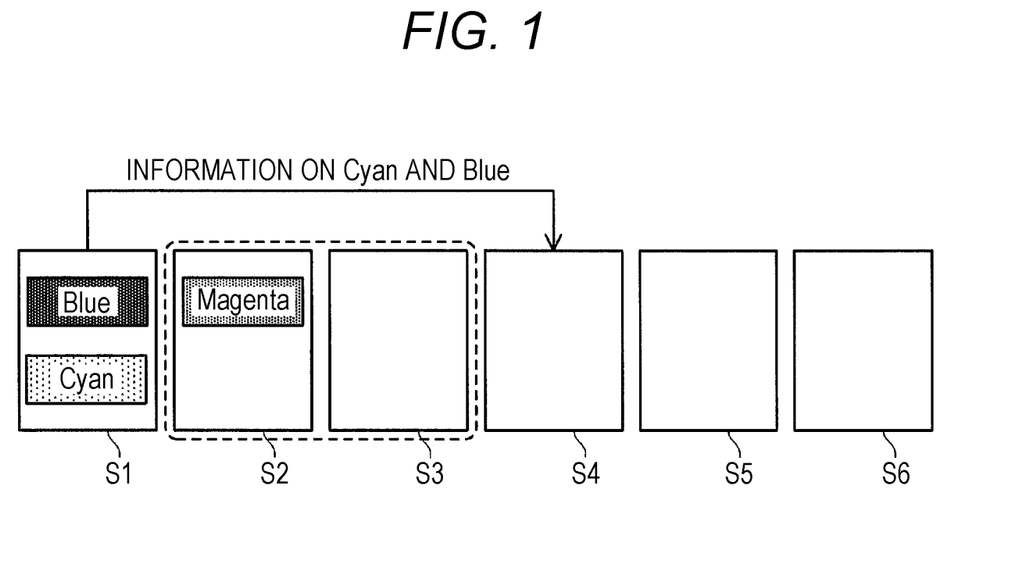
FIG. 1 is a diagram for explaining how information on an image formed on a sheet is fed back.

On the other hand, to suppress the above problem, for example, it can be considered that an output image formed on a sheet is utilized to correct an output image formed on the following sheet. In such correction, colorimetry is performed by a colorimetric section for an output image (a blue image and a cyan image) formed on a sheet S1 as shown in FIG. 1. Then, the detection result by the colorimetric section can be fed back to an image former to correct an output image on a sheet S4 after the sheet S1 based on the detection result.

However, it takes a certain period of time until the detection result is fed back to the image former after the colorimetry is performed for the output image on the sheet S1. In FIG. 1, the detection result is reflected on the correction of the output image on the sheet S4 subsequent to sheets S2 and S3 after the sheet S1. The reason is that input images related to the sheets S2 and S3 are inputted into the image former while the colorimetry is performed for the output image on the sheet S1.

In FIG. 1, the correction based on the detection result of the sheet S1 is applied to the output image on the sheet S4, but output images on the sheets S2 and S3 (a magenta image on the sheet S2 in FIG. 1) are not used to correct output images on sheets after the sheet S4. Therefore, as a result, information used to correct the output images decreases, and thus the accuracy of the correction of the output images may be reduced.

SUMMARY

An object of the present invention is to provide an image forming apparatus and a correction control program capable of highly accurately correcting an output image while suppressing toner consumption and productivity reduction.

To achieve the abovementioned object, according to an aspect of the present invention, an image forming apparatus reflecting one aspect of the present invention comprises: an image former that forms an image, which is desired by a user and different from a predetermined pattern, on a sheet; an output information detector that detects output information on a first image formed on a first sheet by the image former; and a hardware processor that: acquires an correction amount of a third image, which is formed on a third sheet after the first sheet and a second sheet, according to a detection result of the first image by the output information detector and image information on a second image formed on the second sheet after the first sheet by the image former; and controls the image former so as to correct the third image based on the correction amount acquired by the hardware processor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 2:
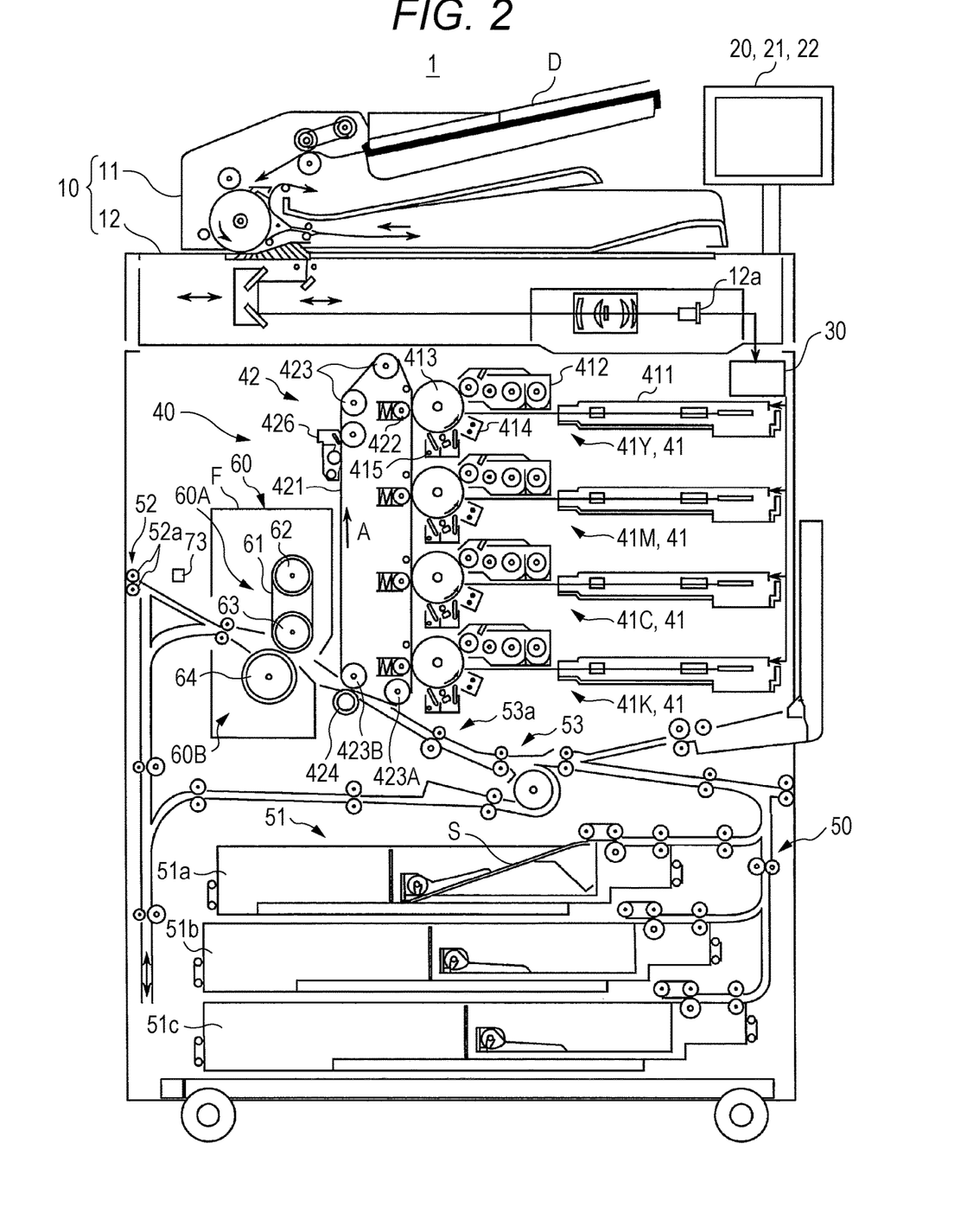
FIG. 2 is a diagram schematically showing the entire configuration of an image forming apparatus according to the present embodiment.
Figure 3:
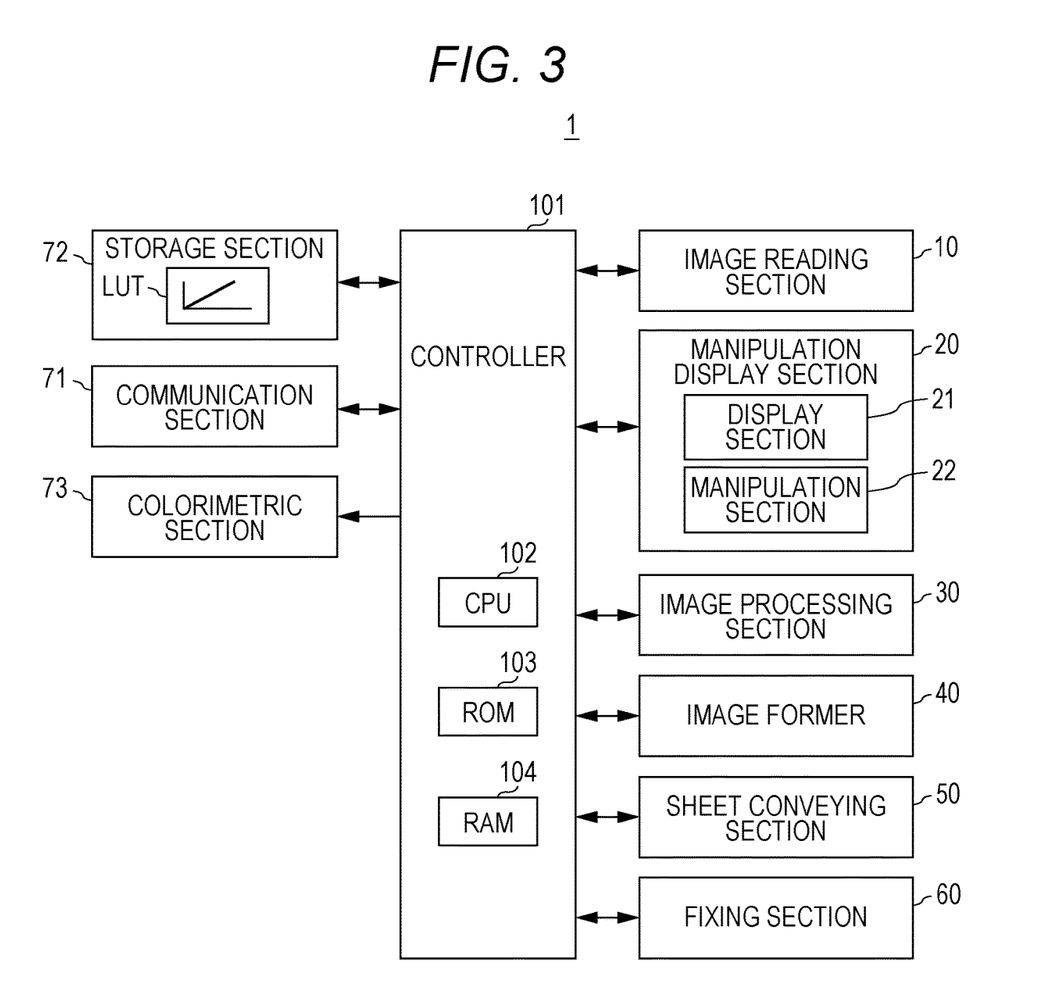
FIG. 3 is a diagram showing a main section of a control system of the image forming apparatus according to the present embodiment.

Hereinafter, one or more embodiments of the present invention will be described in detail with reference to the drawings. However, the scope of the invention is not limited to the disclosed embodiments. FIG. 2 is a diagram schematically showing the entire configuration of an image forming apparatus 1 according to the present embodiment. FIG. 3 is a diagram showing a main section of a control system of the image forming apparatus 1 according to the present embodiment.

As shown in FIG. 2, the image forming apparatus 1 is an intermediate transfer type color image forming apparatus utilizing an electrophotographic process technology. That is, the image forming apparatus 1 primarily transfers a toner image of each color of yellow (Y), magenta (M), cyan (C) and black (K) formed on a photosensitive drum 413 onto an intermediate transfer belt 421, superposes the toner images of the four colors on the intermediate transfer belt 421, and thereafter secondarily transfers the superposed image onto a sheet S sent out from paper feed tray units 51a to 51c, thereby forming an image.

Moreover, the image forming apparatus 1 adopts a tandem system, in which the photosensitive drums 413 for the four colors of Y, M, C and K are arranged in series in the running direction of the intermediate transfer belt 421, and the toner images of the respective colors are sequentially transferred onto the intermediate transfer belt 421 in a single procedure.

As shown in FIG. 3, the image forming apparatus 1 includes an image reading section 10, a manipulation display section 20, an image processing section 30, an image former 40, a sheet conveying section 50, a fixing section 60 and a controller 101.

The controller 101 includes a central processing unit (CPU) 102, a read only memory (ROM) 103, a random access memory (RAM) 104 and the like. The CPU 102 reads out a program for the processing contents from the ROM 103, expands the program in the RAM 104, and centrally controls the operation of each block and the like of the image forming apparatus 1 in cooperation with the expanded program. At this time, various data stored in a storage section 72 are referred. The storage section 72 is configured by, for example, a nonvolatile semiconductor memory (so-called flash memory) or a hard disk drive.

The controller 101 transmits/receives various data to/from an external apparatus (e.g., a personal computer) connected to a communication network, such as a local area network (LAN) or a wide area network (WAN), via a communication section 71. For example, the controller 101 receives image data (input image data) transmitted from the external apparatus and causes an image to be formed on the sheet S based on this image data. The communication section 71 is configured by, for example, a communication control card such as a LAN card.

As shown in FIG. 2, the image reading section 10 is configured to include an automatic document feed apparatus 11 called an auto document feeder (ADF), a document image scanning apparatus 12 (scanner), and the like.

The automatic document feed apparatus 11 conveys a document D placed on a document tray by a conveying mechanism to be sent out to the document image scanning apparatus 12. Images (including ones on the both sides) on a large number of documents D placed on the document tray can be successively read at once by the automatic document feed apparatus 11.

The document image scanning apparatus 12 optically scans the document conveyed onto contact glass from the automatic document feed apparatus 11 or the document placed on the contact glass, irradiates a light receiving face of a charge coupled device (CCD) sensor 12a with the reflected light from the document, and reads the image on the document. The image reading section 10 generates input image data based on the reading result by the document image scanning apparatus 12. This input image data is subjected to predetermined image processing in the image processing section 30.

As shown in FIG. 3, the manipulation display section 20 is configured by, for example, a liquid crystal display (LCD) with a touch panel and functions as a display section 21 and a manipulation section 22. The display section 21 displays various manipulation screens, image states, the operation status of each function, and the like according to a display control signal inputted from the controller 101. The manipulation section 22 includes various manipulation keys such as a numeric keypad and a start key, accepts various input manipulations by a user, and outputs a manipulation signal to the controller 101.

The image processing section 30 includes a circuit that performs digital image processing on the input image data according to the initial setting or the user setting, and the like. For example, the image processing section 30 performs tone correction based on tone correction data (tone correction table) under the control of the controller 101. Besides the tone correction, the image processing section 30 also subjects the input image data to various correction processings such as color correction and shading correction, compression processing, and the like. The image former 40 is controlled based on the image data subjected to these processings.

As shown in FIG. 2, the image former 40 includes image forming units 41Y, 41M, 41C and 41K for forming images of the respective colored toners of a Y component, a M component, a C component and a K component based on the input image data, an intermediate transfer unit 42, and the like.

The image forming units 41Y, 41M, 41C and 41K for the Y component, the M component, the C component and the K component have similar configurations. For convenience of illustration and explanation, common constituents are denoted by the same reference numerals, and Y, M, C or K is added to the reference numerals when the constituents are distinguished. In FIG. 2, only the constituents of the image forming unit 41Y for the Y component are denoted by reference numerals, and reference numerals of the constituents of the other image forming units 41M, 41C and 41K are omitted.

The image forming unit 41 includes an exposure apparatus 411, a developing apparatus 412, a photosensitive drum 413, an electrification apparatus 414, a drum cleaning apparatus 415, and the like.

The photosensitive drum 413 is constituted by, for example, an organic photoreceptor with a photosensitive layer, which is made of a resin containing an organic photoconductor and formed on the outer peripheral face of a drum-shaped metal base.

The controller 101 controls a driving current supplied to a driving motor (not shown) that rotates the photosensitive drum 413, thereby rotating the photosensitive drum 413 with a constant peripheral velocity.

The electrification apparatus 414 is, for example, an electrification charger and generates corona discharge, thereby uniformly and negatively electrifying the surface of the photosensitive drum 413 which has photoconductivity.

The exposure apparatus 411 is configured by, for example, a semiconductor laser and irradiates the photosensitive drum 413 with laser light for an image of each color component. As a result, an electrostatic latent image of each color component is formed in the image region irradiated with the laser light on the surface of the photosensitive drum 413 due to a potential difference with the background region.

The developing apparatus 412 is a two-component reversal type developing apparatus and visualizes the electrostatic latent image by attaching a developer of each color component to the surface of the photosensitive drum 413 to form a toner image.

To the developing apparatus 412, for example, a DC developing bias with the same polarity as the electrification polarity of the electrification apparatus 414, or a developing bias, in which a DC voltage with the same polarity as the electrification polarity of the electrification apparatus 414 is superimposed on an AC voltage, is applied. As a result, reversal development, which attaches the toner to the electrostatic latent image formed by the exposure apparatus 411, is performed.

The drum cleaning apparatus 415 abuts the surface of the photosensitive drum 413, has a placoid drum cleaning blade made of an elastic body or the like, and removes the toner which is not transferred onto the intermediate transfer belt 421 and remains on the surface of the photosensitive drum 413.

The intermediate transfer unit 42 includes the intermediate transfer belt 421, primary transfer rollers 422, a plurality of support rollers 423, a secondary transfer roller 424, a belt cleaning apparatus 426, and the like.

The intermediate transfer belt 421 is configured by an endless belt and stretched in a loop by the plurality of support rollers 423. At least one of the plurality of support rollers 423 is configured by a driving roller, and the other is configured by a driven roller. For example, a roller 423A arranged closer to the downstream side of the belt running direction than the primary transfer roller 422 for the K component is preferably a driving roller. This makes the running speed of the belt at the primary transfer section easier to be kept constant. As the driving roller 423A rotates, the intermediate transfer belt 421 runs at a constant speed in the direction of the arrow A.

The intermediate transfer belt 421 is a belt having conductivity and elasticity, and has a highly resistive layer on the surface thereof. The intermediate transfer belt 421 is rotationally driven by a control signal from the controller 101.

The primary transfer rollers 422 are arranged on the inner peripheral face side of the intermediate transfer belt 421 so as to oppose the photosensitive drums 413 of the respective color components. Primary transfer nips for transferring the toner images onto the intermediate transfer belt 421 from the photosensitive drums 413 are formed by pressing the primary transfer rollers 422 against the photosensitive drums 413 with the intermediate transfer belt 421 sandwiched therebetween.

The secondary transfer roller 424 is arranged on the outer peripheral face side of the intermediate transfer belt 421 so as to oppose a backup roller 423B arranged on the downstream side of the belt running direction of the driving roller 423A. A secondary transfer nip for transferring the toner images onto the sheet S from the intermediate transfer belt 421 is formed by pressing the secondary transfer roller 424 against the backup roller 423B with the intermediate transfer belt 421 sandwiched therebetween.

When the intermediate transfer belt 421 passes the primary transfer nips, the toner images on the photosensitive drums 413 are sequentially superposed and primarily transferred onto the intermediate transfer belt 421. Specifically, by applying a primary transfer bias to the primary transfer rollers 422 to give a charge with a polarity reverse to that of the toner to the back face side of the intermediate transfer belt 421, that is, the side which abuts the primary transfer rollers 422, the toner images are electrostatically transferred onto the intermediate transfer belt 421.

Thereafter, when the sheet S passes the secondary transfer nip, the toner images on the intermediate transfer belt 421 are secondarily transferred onto the sheet S. Specifically, by applying a secondary transfer bias to the secondary transfer roller 424 to give a charge with a polarity reverse to that of the toner to the back face side of the sheet S, that is, the side which abuts the secondary transfer roller 424, the toner images are electrostatically transferred onto the sheet S. The sheet S onto which the toner images have been transferred is conveyed toward the fixing section 60.

The belt cleaning apparatus 426 removes the transfer residual toner remaining on the surface of the intermediate transfer belt 421 after the secondary transfer.

The fixing section 60 includes an upper fixing section 60A, a lower fixing section 60B, a heat source and the like. The upper fixing section 60A has fixing face side members arranged at a fixing face of the sheet S, that is, a face side on which the toner images are formed, and the lower fixing section 60B has a back face side support member arranged at a back face of the sheet S, that is, a face side opposite to the fixing face. By pressing the back face side support member against the fixing face side members, a fixing nip that sandwiches and conveys the sheet S is formed.

In the fixing section 60, the toner images are secondarily transferred, and the conveyed sheet S is heated and pressurized with the fixing nip, thereby fixing the toner images on the sheet S. The fixing section 60 is arranged as a unit in a fixing device F.

The upper fixing section 60A has an endless fixing belt 61, a heating roller 62 and a fixing roller 63, which are the fixing face side members. The fixing belt 61 is stretched by the heating roller 62 and the fixing roller 63.

The lower fixing section 60B has a pressure roller 64, which is the back face side support member. The fixing nip that sandwiches and conveys the sheet S is formed between the pressure roller 64 and the fixing belt 61.

The sheet conveying section 50 includes a paper feed section 51, a paper ejection section 52, a conveying path section 53, and the like. In the three paper feed tray units 51a to 51c configuring the paper feed section 51, the sheets S (standard sheets, special sheets) distinguished based on basis weight, size or the like are accommodated by each preset type. The conveying path section 53 has a plurality of pairs of conveying rollers including a pair of registration rollers 53a. A registration roller section in which the pair of registration rollers 53a is disposed corrects the inclination and deviation of the sheet S.

The sheets S accommodated in the paper feed tray units 51a to 51c are sent out one by one from the uppermost section and conveyed to the image former 40 by the conveying path section 53. In the image former 40, the toner images on the intermediate transfer belt 421 are secondarily transferred onto one face of the sheet S collectively and subjected to a fixing step in the fixing section 60. The sheet S on which the image has been formed is ejected to the outside of the apparatus by the paper ejection section 52 including paper ejection rollers 52a.

Moreover, a colorimetric section 73 is provided on the downstream side of the fixing section 60. The colorimetric section 73 performs colorimetry for the image formed on the sheet S and detects output information which is the colorimetric result. A colorimetric target image is not a predetermined pattern prepared in advance for image quality correction or the like, but is a desired image which the user is actually about to output. The colorimetric section 73 corresponds to an "output information detector" of the present invention.

The colorimetric section 73 outputs the detection result of the output information to the controller 101. The output image formed on the sheet S preferably coincides with the input image inputted in the image forming apparatus 1, but there are cases where the output image and the input image do not coincide with each other depending on the surrounding environment, the type of sheet, and the durable conditions. Therefore, the controller 101 corrects the output image on the sheet S on the detection result by the colorimetric section 73.

As shown in FIG. 1, the colorimetry is performed by the colorimetric section 73 for the output image (the blue image and the cyan image) formed on the sheet S1. Then, the detection result by the colorimetric section 73 can be fed back to the image former 40 via the controller 101 to correct the output image on the sheet S4 after the sheet S1 based on the detection result.

The sheet S1 corresponds to a "first sheet" of the present invention, and the output image on the sheet S1 corresponds to a "first image" of the present invention. The sheet S4 corresponds to a "third sheet" of the present invention, and the output image on the sheet S4 corresponds to a "third image" of the present invention.

Note that, in the present embodiment, the correction based on the colorimetric result of the sheet subjected to the colorimetry is set to be reflected on the output image on the sheet (sheet S4) on which the image is formed after three sheets (predetermined number of sheets) from the sheet (sheet S1) subjected to the colorimetry. Moreover, the predetermined number of sheets is the number of sheets that is set as appropriate according to the image forming conditions, sheet conditions, or the like.

Specifically, the information on the output image on the sheet S1 is estimated cyan information and estimated magenta information, which are estimated from the image of blue which is the mixed color of cyan and magenta, and actual cyan measurement information which is information on the actual measurement of the image of cyan.

Herein, since the image desired by the user and different from the predetermined pattern does not necessarily have all the colors necessary for the correction of the output image, the information used for the correction of the output image is preferably as much as possible. Note that the predetermined pattern is, for example, a test pattern whose image is formed for the correction of the output image, such as a patch image or the like.

Furthermore, since the actual measurement information is information actually measured from an image of a specific color which is any one of colors of Y, M, C and K and is information reflecting density unevenness and the like caused by the specific color, highly accurate correction can be performed when the actual measurement information is used for the correction of the output image. On the other hand, the estimated information is information obtained by estimating image information on the specific color from image information on a mixed color of a plurality of colors including the specific color and is information including density unevenness and the like of each color mixed. Compared with the actual measurement information, the accuracy of the correction of the output image is slightly reduced.

For example, when a cyan image is included in the output image on the sheet S4, estimated cyan information and actual cyan measurement information are obtained from the output image on the sheet S1. In this case, since a plurality of pieces of information, the estimated information and the actual measurement information, are obtained and the actual measurement information is included therein, it can be considered that the cyan image can be highly accurately corrected.

On the other hand, when a magenta image is included in the output image on the sheet S4, only the estimated magenta information is obtained from the output image on the sheet S1. Thus, it can be considered that the accuracy of the correction of the magenta image is slightly lower than that of the correction of the cyan image.

Incidentally, it takes a certain period of time until the detection result is fed back to the image former 40 after the colorimetry is performed for the output image on the sheet S1. In FIG. 1, the detection result is reflected on the correction of the output image on the sheet S4 subsequent to sheets S2 and S3 after the sheet S1. The reason is that information on the input images related to the sheets S2 and S3 is inputted into the image former 40 while the colorimetry is performed for the sheet S1.

In FIG. 1, when the correction based on the detection result of the sheet S1 is applied to the output image on the sheet S4, the output images on the sheets S2 and S3 are not used to correct the output image on the sheet S4. Then, since the output information on the sheets S2 and S3 becomes data before the correction, the output information on the sheets S2 and S3 is not used for sheets S5 and S6 after the sheet S4, and the correction amount applied to the output image on the sheet S4 is applied thereto. Therefore, as a result, information used to correct the output images decreases, and thus the accuracy of the correction of the output images may be reduced.

Thereupon, in the present embodiment, the controller 101 calculates the correction amount of the output image, which is formed on the sheet S4 after the sheets S1, S2 and S3, according the detection result of the output image on the sheet S1 by the colorimetric section 73 and the image information on the output images formed on the sheets S2 and S3.

The controller 101 calculates the correction amounts of the output images, which are formed on the sheets S5 and S6, by using at least one of the detection results of the output images on the sheets S2 and S3 by the colorimetric section 73 and the correction amount of the output image on the sheet S4.

The sheets S2 and S3 correspond to a "second sheet" of the present invention, and the output images on the sheets S2 and S3 correspond to a "second image" of the present invention. The sheets S5 and S6 correspond to a "fourth sheet" of the present invention, and the output images on the sheets S5 and S6 correspond to a "fourth image" of the present invention.

Then, the controller 101 controls the image former 40 so as to correct the respective output images on the sheets S4, S5, and S6 based on the correction amounts. The controller 101 corresponds to an "correction amount acquisitor" and a "correction amount controller" of the present invention.

Note that, in the embodiment, the output images are corrected by adding (subtracting) the correction amount to a set value of, for example, the preset developing bias in the image forming conditions.

In the case of FIG. 1, since the magenta image is included in the output image on the sheet S2, if the actual measurement information on the image can be used for the correction of the output images on the sheet S4 and the followings, it can be considered that highly accurate correction can be performed as compared with the correction using only the estimated information on the sheet S1.

Figure 4:
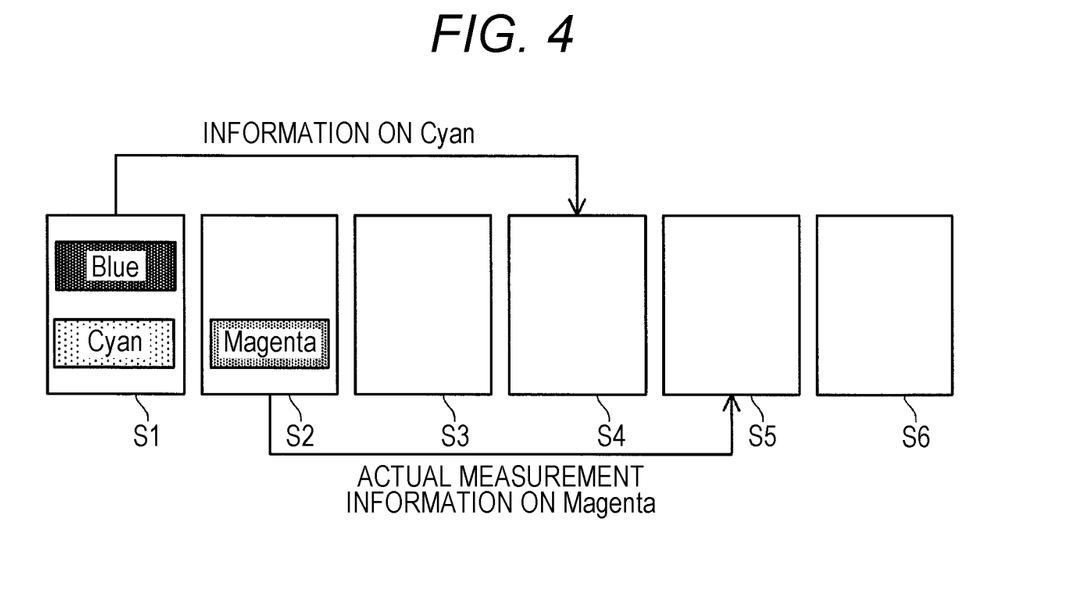
FIG. 4 is a diagram for explaining how information on an image formed on a sheet is fed back.

In consideration of this, as shown in FIG. 4, the controller 101 applies, to the output image on the sheet S4, only the cyan correction amount acquired by calculating based on the output information on the sheet S1, but does not apply the magenta correction amount calculated based on the output information on the sheet S1.

That is, based on the detection result of the output information on the sheet S1 and the image information on the sheet S2, the controller 101 calculates the magenta correction amount as zero. Then, the controller 101 applies, to the output image on the sheet S5, the magenta correction amount acquired by calculating based on the output information on the sheet S2.

In this way, the magenta correction is not applied to the sheet S4, but the correction amount based on the output image on the sheet S2, which is expected to be used for good correction, is applied to the sheets S5 and the followings. Thus, it is possible to effectively utilize the output information on the sheet S2 during a period from that the output information on the sheet S1 is detected until that the detection result is fed back to the image former 40.

Figure 5:
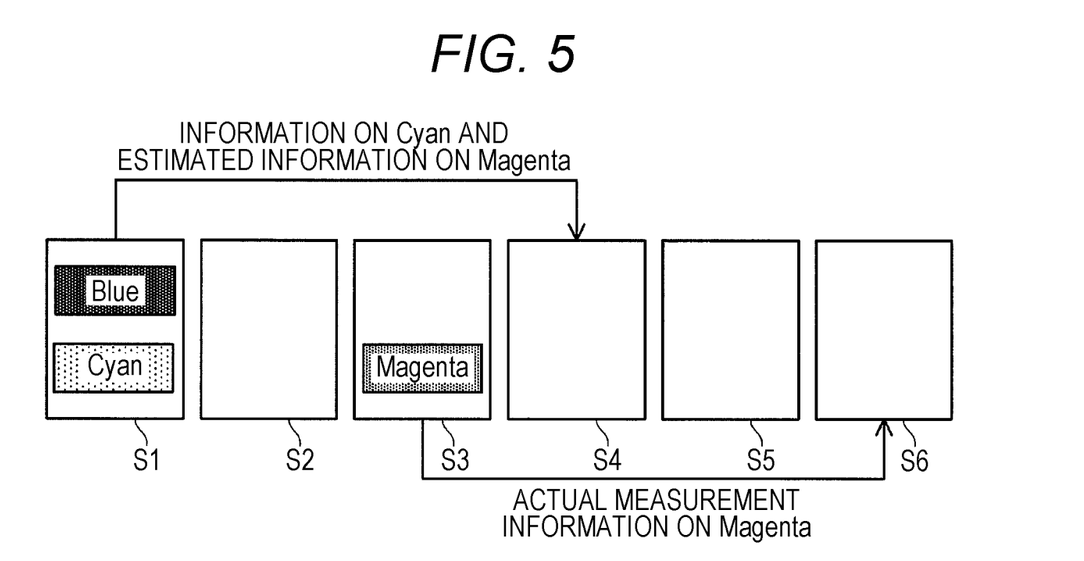
FIG. 5 is a diagram for explaining how information on an image formed on a sheet is fed back.

Moreover, as shown in FIG. 5, when the image of only magenta is included in the output image on the sheet S3, the correction amount based on the output information on the sheet S3 is applied to the sheet S6 by preforming correction in a similar manner in FIG. 4. However, for the sheets S4 and S5, the magenta correction is not performed.

Therefore, for the sheets S4 and S5, the controller 101 calculates correction amounts based on the output information on the sheet S1 based on the detection result of the output information on the sheet S1 and the image information on the sheet S3. Then, for the sheet S6, the correction amount of the output image on the sheet S6 is calculated so that the correction amount becomes a third correction amount obtained by subtracting a second correction amount based on the output information on the sheet S1 from a first correction amount based on the output information on the sheet S3. That is, suppose that the first correction amount is T1 and the second correction amount is T2, then the third correction amount is T1−T2.

Since the second correction amount has already been applied to the sheets S4 and S5, before the second correction amount of the output image on the sheet S4 is applied, that is, when the correction amount is 0 serving as a reference, the third correction amount of the output image on the sheet S6 is (T1−T2)+T2=T1. That is, as a result, the correction amount of the output image on the sheet S6 can be a correction amount similar to the correction amount for the sheet S5 in FIG. 4, that is, a correction amount similar the correction amount of a case where the second correction amount is not applied to the output images on the sheets S4 and S5. In addition, the correction can be performed for the sheets S4 and S5 without insufficiency.

Furthermore, in the case of the correction by the estimated information, colors other than the specific color are included, so that there is a possibility that the correction amount of the specific color becomes excessive, for example, when the correction amounts due to the other colors are large. Therefore, the controller 101 multiplies provisional correction amounts calculated based on only the output information on the sheets S1, S2 and S3, that is, the colorimetric results of the colorimetric section 73 by application ratios to calculate the correction amounts for the sheets S4, S5 and S6.

In the present embodiment, the provisional correction amount for the sheet S4 is calculated from the output information on the sheet S1, the provisional correction amount for the sheet S5 is calculated from the output information on the sheet S2, and the provisional correction amount for the sheet S6 is calculated from the output information on the sheet S3.

The application ratio varies depending on reliability set by the image information on each sheet. The reliability is information indicating the correctness as to whether or not the correction amount obtained from the output information can correctly correct the variation amount of the output image. As for the reliabilities set for the respective pieces of image information, the application ratio of the provisional correction amount calculated based on the image with higher reliability is set to be greater than the application ratio of the provisional correction amount calculated based on the image with lower reliability.

The reliability is determined, for example, based on whether the information obtained from the output information is estimated information or actual measurement information. Specifically, the reliability set for the image information on only the specific color, that is, first image information including the actual measurement information is set to be higher than the reliability set for the image information on the mixed color obtained by mixing a plurality of colors including the specific color, that is, second image information including the estimated information and not including the image information on only the specific color.

Alternatively, the reliability may be set according to the number of pixels on the sheet. When the number of pixels of the specific color is relatively large on the sheet, the information used for the correction becomes large. Thus, it can be considered that effective information increases. Therefore, the greater the number of pixels on the sheet, the higher the reliability is set. In other words, the reliability is set to be lower as the number of pixels included in the image information is smaller.

Alternatively, the reliability may be determined by the positions of the pixels on the sheet. For example, the possibility that the information is not influenced by the density unevenness and the like caused by the specific position becomes higher when the image is arranged in a dispersed manner rather than the image is concentratedly arranged on a specific portion on the sheet. Therefore, the greater the degree of dispersion of the pixels on the sheet, the higher the reliability is set. The reliability is set to be lower as the degree of dispersion of the plurality of pixels included in the image information is smaller.

Note that the pixel dispersion herein is a distance between pixels on the sheet, and the distance may be the maximum value or the average value of the distances when there are a plurality of data.

Next, examples of the calculation of the correction amounts will be described with reference to FIGS. 6A to 6E. FIGS. 6A to 6E are diagrams showing parameters used for the correction amount calculation and the calculation results for the correction amounts.

The "sheet" in FIGS. 6A to 6E indicates a sheet from which the output information is detected. That is, the "sheet" indicates each of the sheets S1, S2 and S3 in FIGS. 1, 4 and 5. The "correction-applied sheet" in FIGS. 6A to 6E indicates a sheet to which the correction amount calculated in the "sheet" is applied. That is, the "correction-applied sheet" indicates each of the sheets S4, S5 and S6 in FIGS. 1, 4 and 5.

In the examples shown in FIGS. 6A to 6E, examples in which the correction amount calculated based on the colorimetric sheet, for which the colorimetry is performed by colorimetric section, is applied to the third sheet from the colorimetric sheet as in FIGS. 1, 4 and 5, are shown. That is, the correction amount calculated based on the sheet S1 is applied to the sheet S4 after the sheets S2 and S3, the correction amount calculated based on the sheet S2 is applied to the sheet S5, and the correction amount calculated based on the sheet S3 is applied to the sheet S6.

The "color" in FIGS. 6A to 6E indicates the color of image, and "Y," "M," "C," and "K" indicate yellow, magenta, cyan and black, respectively. The "color information" in FIGS. 6A to 6E indicates whether the information is one of the actual measurement information and the estimated information. The "pixel position" in FIGS. 6A to 6E indicates the position of the image on the sheet. In the "pixel position," the "center" indicates that the image is positioned near the center of the sheet, the "left end" indicates that the image is positioned near the left end of the sheet, and the "right end" indicates that the image is positioned near the right end of the sheet. In addition, the "provisional correction amount," the "color information" and the "pixel position" are parameters used for the correction amount calculation.

Moreover, the correction amounts in the examples shown in FIGS. 6A to 6E are calculated by multiplying the one, which is obtained by subtracting the already-applied correction amount applied to the immediately preceding sheet of the correction-applied sheet, from which the correction amount is calculated, from the provisional correction amount for the sheet used for the correction of the correction-applied sheet, by the application ratio set for the sheet. Furthermore, for the sheet S4, the correction amount is calculated with the already-applied correction amount to the sheet S3 of the immediately preceding sheet being set to zero.

First, an example in a case where the color information obtained from the sheet S1 is different from the color information obtained from the sheet S2 will be described. Note that FIG. 6A shows a case where the color used for the correction is yellow and a case where the pixel position is at the center of both the sheets S1 and S2.

Figure 6A:
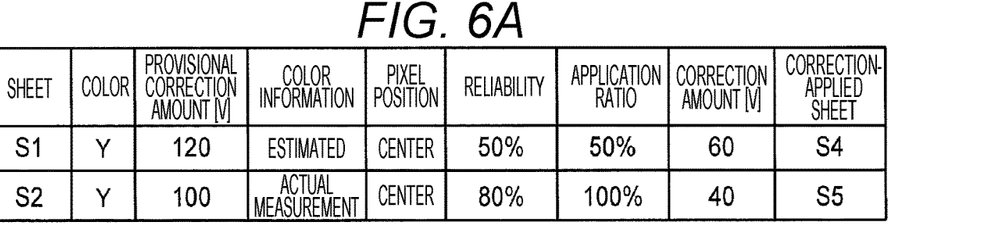
FIGS. 6A to 6E are diagrams showing parameters used for correction amount calculation and the calculation results for the correction amounts.

As shown in FIG. 6A, the controller 101 compares the image information on the sheet S1 with the image information on the sheet S2 and sets the reliability for each image information. The color information on the sheet S1 is estimated information, and the color information on the sheet S2 is actual measurement information. Therefore, the reliability for the image information on the sheet S2 is set to be higher than that for the image information on the sheet S1. Specifically, the reliability set for the image information on the sheet S1 is 50%, and the reliability set for the image information on the sheet S2 is 80%.

Then, the controller 101 determines the application ratio based on the reliability set for the image information on each of sheets S1 and S2. In the example in FIG. 6A, since the reliability of the sheet S2 is higher than that of the sheet S1, the application ratio of 100% is set to the sheet S2. As for the sheet S1, the information is estimated information and there is a possibility of being influenced by colors other than yellow. Thus, in consideration of excessive correction, the application ratio is set to 50%, which is relatively low.

In this case, when the provisional correction amount calculated from the output information on the sheet S1 is 120 V, the correction amount for the correction-applied sheet S4 from the sheet S1 is 60 V, which is calculated by multiplying the one, which is obtained by subtracting the already-applied correction amount of zero from 120 V, by the application ratio of 50%.

When the provisional correction amount calculated from the output information on the sheet S2 is 100 V, the correction amount for the correction-applied sheet S5 from the sheet S2 is 40 V, which is calculated by multiplying the one, which is obtained by subtracting the correction amount of 60 V for the sheet S4, which is the already-applied correction amount, from 100 V, by the application ratio of 100%. Thus, the sum of the correction amount for the sheet S4 and the correction amount for the sheet S5 becomes 100 V and can be the correction amount equivalent to the provisional correction amount obtained from the sheet S2 with high reliability.

Next, an example in a case where the number of images is different between the sheets S1 and S2 will be described. Note that FIG. 6B shows a case where the color used for the correction is magenta and a case where the color information on both sheets S1 and S2 is actual measurement information and the pixel position is at the center of both the sheets S1 and S2.

Figure 6B:
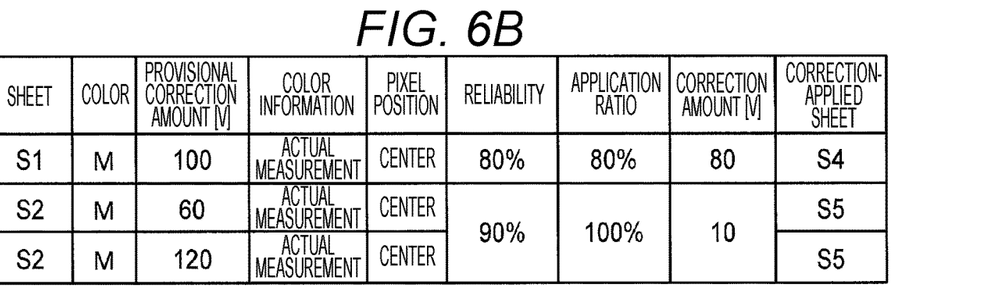

As shown in FIG. 6B, the controller 101 compares the image information on the sheet S1 with the image information on the sheet S2 and sets the reliability for each image information. The number of images on the sheet S1 is one, and the number of images on the sheet S2 is two. Therefore, the reliability for the image information on the sheet S2 is set to be higher than that for the image information on the sheet S1. Specifically, the reliability set for the image information on the sheet S1 is 80%, and the reliabilities set for the image information on the sheet S2 are 90%.

Then, the controller 101 determines the application ratio based on the reliability set for the image information on each of sheets S1 and S2. In the example in FIG. 6B, since the reliabilities of the sheet S2 are higher than that of the sheet S1, the application ratio of 100% is set to the sheet S2. For the sheet S1, the application ratio is set to 80%, which is lower than the application ratios of the sheet S2. The reason that the application ratio of the sheet S1 is relatively high is that the information obtained from the sheet S1 is actual measurement information and relatively highly reliable information.

In this case, when the provisional correction amount calculated from the output information on the sheet S1 is 100 V, the correction amount for the correction-applied sheet S4 from the sheet S1 is 80 V, which is calculated by multiplying the one, which is obtained by subtracting the already-applied correction amount of zero from 100 V, by the application ratio of 80%.

When the provisional correction amounts calculated from the output information on the sheet S2 are 60 V and 120 V, the correction amount for the correction-applied sheet S5 from the sheet S2 is 10 V, which is calculated by multiplying the one, which is obtained by subtracting the correction amount of 80 V for the sheet S4, which is the already-applied correction amount, from the averaged 90 V, by the application ratio of 100%. Thus, the sum of the correction amount for the sheet S4 and the correction amount for the sheet S5 becomes 90 V and can be the correction amount equivalent to the average provisional correction amount obtained from the sheet S2 with high reliability.

Next, an example in a case where the pixel position is different between the sheet S1 and the sheet S2 will be described. Note that FIG. 6C show a case where the color used for the correction is cyan and a case where the color information on both sheets S1 and S2 is actual measurement information and the number of images is two on both sheets S1 and S2.

Figure 6C:
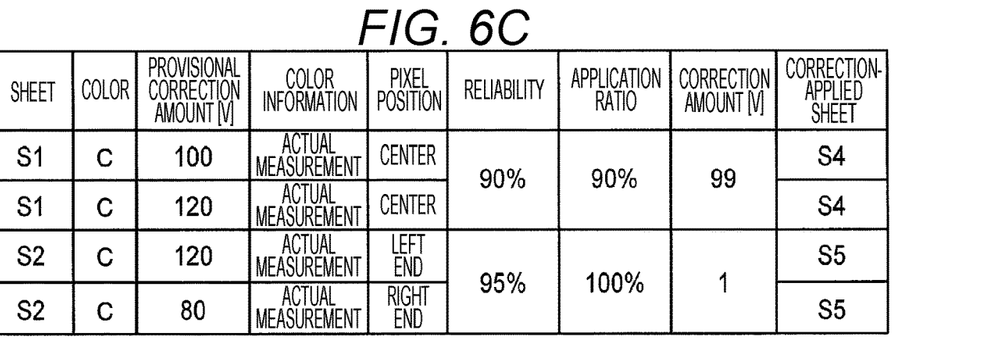

As shown in FIG. 6C, the controller 101 compares the image information on the sheet S1 with the image information on the sheet S2 and sets the reliability for each image information. The two pixel positions on the sheet S1 are both at the center, and the pixel positions on the sheet S2 are at the left end and the right end, respectively. The pixel positions are concentrated at the center of the sheet S1, but the pixel positions are arranged dispersedly at the right end and the left end of the sheet S2. That is, the degree of dispersion of the images is greater on the sheet S2 than the sheet S1 so that the density unevenness and the like due to the pixel positions are less likely to influence the sheet S2 than the sheet S1.

Therefore, the reliability for the image information on the sheet S2 is set to be higher than that for the image information on the sheet S1. Specifically, the reliabilities set for the image information on the sheet S1 are 90%, and the reliabilities set for the image information on the sheet S2 are 95%.

Then, the controller 101 determines the application ratio based on the reliability set for the image information on each of sheets S1 and S2. In the example in FIG. 6C, since the reliabilities of the sheet S2 are higher than those of the sheet S1, the application ratios of 100% are set to the sheet S2. For the sheet S1, the application ratios are set to 90%, which are lower than the application ratios of the sheet S2. The reason that the application ratios of the sheet S1 are relatively high is that the information obtained from the sheet S1 is actual measurement information with the number of images as two and is relatively highly reliable information.

In this case, when the provisional correction amounts calculated from the output information on the sheet S1 are 100 V and 120 V, the correction amounts for the correction-applied sheet S4 from the sheet S1 is 99 V, which is calculated by multiplying the one, which is obtained by subtracting the already-applied correction amount of zero from averaged 110 V, by the application ratios of 90%.

When the provisional correction amounts calculated from the output information on the sheet S2 are 120 V and 80 V, the correction amounts for the correction-applied sheet S5 from the sheet S2 is 1 V, which is calculated by multiplying the one, which is obtained by subtracting the correction amount of 99 V for the sheet S4, which is the already-applied correction amount, from the averaged 100 V, by the application ratios of 100%. Thus, the sum of the correction amount for the sheet S4 and the correction amount for the sheet S5 becomes 100 V and can be the correction amount equivalent to the average provisional correction amount obtained from the sheet S2 with high reliability.

Next, an example in a case where the color information obtained from the sheet S1 is different from the color information obtained from the sheet S2 will be described. Note that FIG. 6D shows a case where the color used for the correction is black and a case where the pixel position is at the center of both the sheets S1 and S2.

Figure 6D:
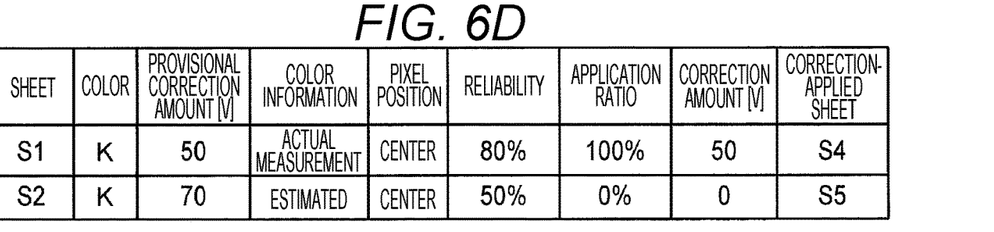

As shown in FIG. 6D, the controller 101 compares the image information on the sheet S1 with the image information on the sheet S2 and sets the reliability for each image information. The color information on the sheet S1 is actual measurement information, and the color information on the sheet S2 is estimated information. Therefore, the reliability for the image information on the sheet S1 is set to be higher than that for the image information on the sheet S2. Specifically, the reliability set for the image information on the sheet S1 is 80%, and the reliability set for the image information on the sheet S2 is 50%.

Then, the controller 101 determines the application ratio based on the reliability set for the image information on each of sheets S1 and S2. In the example in FIG. 6D, since the reliability of the sheet S1 is higher than that of the sheet S2, the application ratio of 100% is set to the sheet S1. As for the sheet S2, since the information is estimated information and the correction is preferably performed by the information obtained from the sheet S1 with high reliability, the application ratio is set to 0%.

In this case, when the provisional correction amount calculated from the output information on the sheet S1 is 50 V, the correction amount for the correction-applied sheet S4 from the sheet S1 is 50 V, which is calculated by multiplying the one, which is obtained by subtracting the already-applied correction amount of zero from 50 V, by the application ratio of 100%.

When the provisional correction amount calculated from the output information on the sheet S2 is 70 V, the correction amount for the correction-applied sheet S5 from the sheet S2 is 0 V, which is calculated by multiplying the one, which is obtained by subtracting the correction amount of 50 V for the sheet S4, which is the already-applied correction amount, from 70 V, by the application ratio of 0%. Thus, the sum of the correction amount for the sheet S4 and the correction amount for the sheet S5 becomes 50 V and can be the correction amount equivalent to the provisional correction amount obtained from the sheet S1 with high reliability.

Next, examples for the three sheets of S1 to S3 will be described. Specifically, an example in a case where the color information obtained from the sheet S1, the color information obtained from the sheet S2 and the color information obtained from the sheet S3 are different will be described. Note that FIG. 6E shows a case where the color used for the correction is yellow and a case where the pixel position is at the center of all the sheets S1 to S3.

Figure 6E:
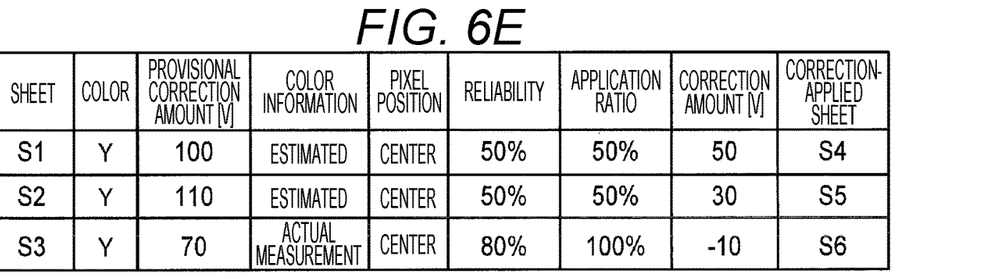

As shown in FIG. 6E, the controller 101 compares the image information on the sheet S1 with the image information on the sheet S2 and the image information on the sheet S3 and sets the reliability for each image information. The color information on the sheet S1 and the color information on the sheet S2 are estimated information, and the color information on the sheet S3 is actual measurement information.

Therefore, the reliability for the image information on the sheet S3 is set to be higher than those for the image information on the sheet S1 and the image information on the sheet S2. Specifically, the reliability set for the image information on the sheet S1 and the reliability set for the image information on the sheet S2 are 50%, and the reliability set for the image information on the sheet S3 is 80%.

Then, the controller 101 determines the application ratio based on the reliability set for the image information on each of sheets S1, S2 and S3. In the example in FIG. 6E, since the reliability of the sheet S3 is higher than those of the sheets S1 and S2, the application ratio of 100% is set to the sheet S3. As for the sheets S1 and S2, the information is estimated information and there is a possibility of being influenced by colors other than yellow. Thus, in consideration of excessive correction, the application ratios are set to 50%, which are relatively low.

In this case, when the provisional correction amount calculated from the output information on the sheet S1 is 100 V, the correction amount for the correction-applied sheet S4 from the sheet S1 is 50 V, which is calculated by multiplying the one, which is obtained by subtracting the already-applied correction amount of zero from 100 V, by the application ratio of 50%.

When the provisional correction amount calculated from the output information on the sheet S2 is 110 V, the correction amount for the correction-applied sheet S5 from the sheet S2 is 30 V, which is calculated by multiplying the one, which is obtained by subtracting the already-applied correction amount of 50 V from 110 V, by the application ratio of 50%.

When the provisional correction amount calculated from the output information on the sheet S3 is 70 V, the correction amount for the correction-applied sheet S6 from the sheet S3 is −10 V, which is calculated by multiplying the one, which is obtained by subtracting 80 V, the sum of the correction amount of 50 V for the sheet S4, which is the already-applied correction amount, and the correction amount of 30 V for the sheet S5, from 70 V, by the application ratio of 100%. Thus, the sum of the correction amount for the sheet S4, the correction amount for the sheet S5 and the correction amount for the sheet S6 becomes 70 V and can be the correction amount equivalent to the provisional correction amount obtained from the sheet S3 with high reliability.

Moreover, in the above examples, the correction based on the output information on sheet S1, for which the colorimetry is performed, is reflected on the sheet S4, the third sheet after sheet S1, but the timing at which the correction is reflected varies depending on the image forming conditions. For example, the timing varies according to the distance from the image former 40 to the colorimetric section 73. This is because an image formed on the next sheet is inputted into the image former 40 while the colorimetry is being performed in the colorimetric section 73.

Furthermore, the timing varies according to the sheet conditions. This is because the operation speed of the image forming apparatus 1 and the number of sheets for the distance from the image former 40 to the colorimetric section 73 vary according to the basis weight, type and size of the sheet. Further, the timing varies by the control in the controller 101. This is because the control time varies due to the delay of various arithmetic processings and interrupt processing.

When the correction based on the output information is reflected on a correction-applied sheet of, for example, a several tenth sheet from the colorimetric sheet for which the colorimetry is performed, the data amount obtained when the correction amount of the output image on the correction-applied sheet is calculated becomes large. However, when highly reliable data is considerably after the colorimetric sheet, a considerable number of sheets are printed until the correction based on the highly reliable data is performed, and thus there is a possibility that the color variation of the output image on each sheet increases.

Moreover, when there are a large number of pieces of estimated information, there is a possibility that appropriate correction is not performed. Thus, at this time, there are many printing failures occurred on the sheet which has been printed, and thus reprinting is required. Furthermore, it is troublesome for the user to remove the sheet on which printing failures occurred. From these, it is preferable to reduce the trouble of the user while the number of sheets requiring reprinting is minimized.

Thereupon, in the present embodiment, the controller 101 controls the application timing at which the calculated correction amount is applied according to print processing conditions. In other words, the controller 101 performs control to change the predetermined number of sheets set between the colorimetric sheet (first sheet) and the correction-applied sheet (third sheet) according to the print processing conditions. Note that this control may be automatically judged by the controller 101 or may be performed by user settings.

The predetermined number of sheets is the number of sheets on which images are formed between the colorimetric sheet and the correction-applied sheet. That is, an image is formed on the correction-applied sheet after the predetermined number of sheets from the colorimetric sheet. The print processing conditions include the number of pages, the number of copies, and the like.

For example, in the case of print processing in which the number of pages is small and the number of copies is large, the application timing is changed such that the application of the correction amount calculated based on the first page of the first copy is applied to the first page of a different copy. For example, in a case where the number of pages of a copy is only five pages, when the correction amount is applied to the correction-applied sheet of the third sheet from the colorimetric sheet as described above, the correction amount calculated by the sheet S3 subsequent to the sheets S1 and S2 is applied to a sheet of the first page of the next copy.

In such a way, the copy changes in the course of the series of correction processings by the sheets S1, S2 and S3. That is, in the first copy, the correction processings are performed for only the fourth and the fifth pages. In a case where the number of pages of copy is small, when the one for which the correction processing is not performed and the one for which the correction processing has been performed are mixed in the copy, there is a possibility that the image difference between them becomes conspicuous.

Thereupon, in such a case, by applying the correction processing from the first page of the different copy, it is possible to clearly separate the copy for which the correction processing is not performed and the copy for which the correction processing has been performed. For the copy for which the correction processing is not performed, it can be judged that reprinting is unnecessary for the one without an image difference which is judged to be a printing failure as a whole. In addition, for the one with a printing failure, it is possible to process by each copy. As a result, the work for reprinting can be simplified. Thus, it is possible to reduce the trouble of the user while the number of sheets requiring reprinting is minimized.

Moreover, in a case of print processing with a large number of pages and a small number of copies, the application timing is changed such that the correction amount is applied as soon as possible. By doing so, it is possible to minimize the number of sheets with a printing failure portion and reduce the user cost.

Furthermore, the printing processing conditions include a condition that the same image is on a plurality of pages successively. In such a case, the application timing of the correction amount is changed so as to be the timing at which the plurality of pages end. In a case of different images, it is difficult to visually recognize the color variation. As a result, the image difference is hardly judged as a printing failure. Therefore, it is possible to reduce the possibility of occurrence of a sheet which is judged to be a printing failure.

Figure 7:
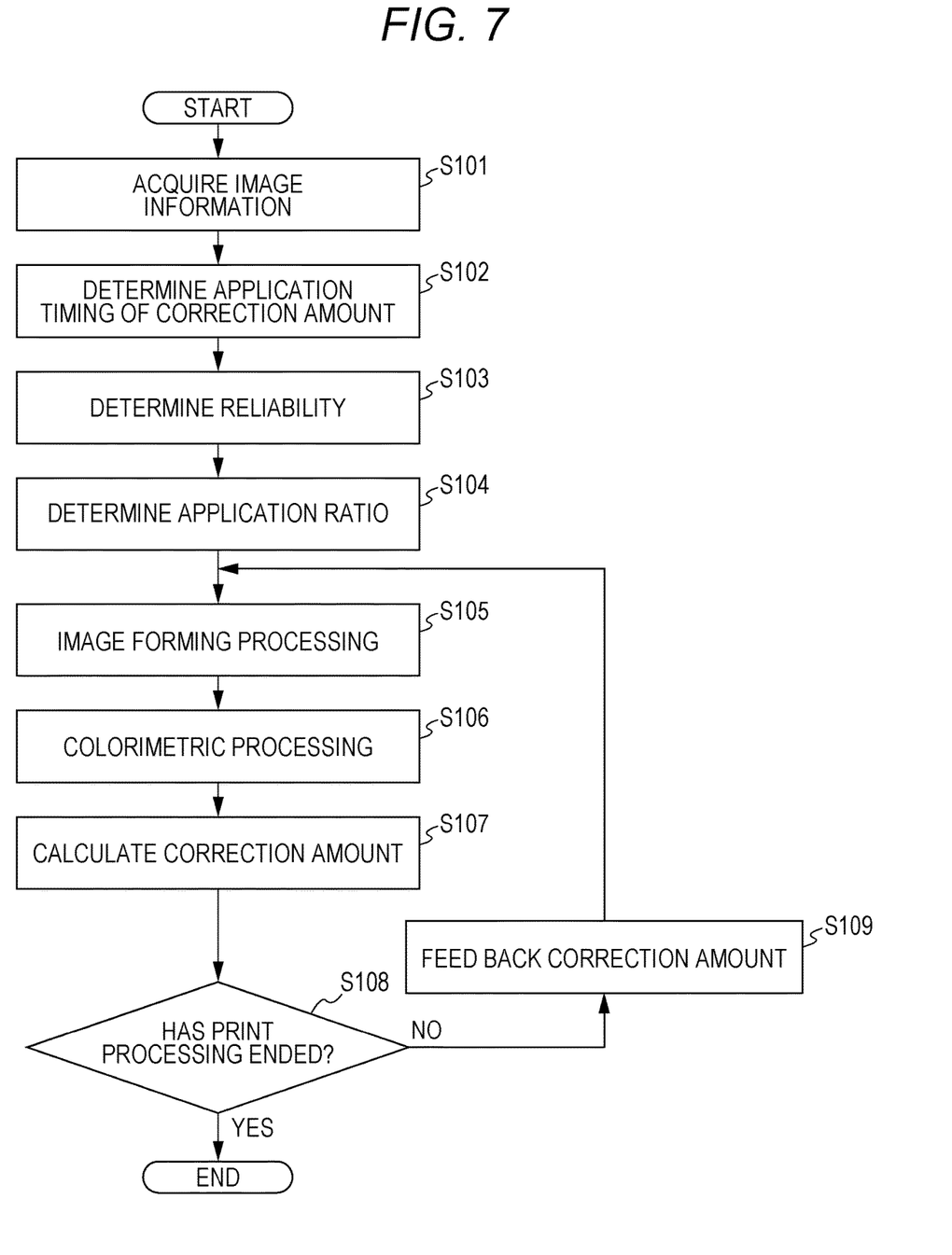
FIG. 7 is a flowchart showing one example of the operation example when the correction control is executed in the image forming apparatus.

Next, an example of the operation example when the correction control is executed in the image forming apparatus 1 will be described. FIG. 7 is a flowchart showing one example of the operation example when the correction control is executed in the image forming apparatus 1. The processings in FIG. 7 are executed when the controller 101 receives an instruction to execute the print processing.

As shown in FIG. 7, the controller 101 acquires the image information on each sheet in the print processing (Step S101). Next, the controller 101 determines the application timing of the correction amount from the conditions of the print processing (Step S102).

Next, the controller 101 determines the reliability for the image information on each sheet (Step S103). Next, the controller 101 determines the application ratio multiplied by the provisional correction amount of the output image formed on each sheet (Step S104). Next, the controller 101 executes the image forming processing (Step S105). Note that the image forming conditions in Step S105 are conditions to which the correction amount is applied when the correction amount is calculated in Step S107 described later.

Next, the controller 101 executes the colorimetric processing for the sheet on which the image has been formed (Step S106). Next, the controller 101 calculates the correction amount based on the output information and the image information on the sheet subjected to the colorimetric processing (Step S107).

Next, the controller 101 decides whether or not the print processing has ended (Step S108). As a result of the decision, when the print processing has not ended (NO in Step S108), the controller 101 feeds back the correction amount to the image former 40 to be applied to the image forming conditions (Step S109). After Step S109, the processing returns to Step S105. On the other hand, when the print processing has ended (YES in Step S108), the present control ends.

According to the present embodiment configured as described above, the output image is corrected based on the image which is desired by the user and different from the predetermined pattern. Therefore, the correction patch is not formed so that is possible to suppress toner consumption as well as suppress productivity reduction since the print processing is not interrupted for the correction patch.

Moreover, the correction amount of the output image on the sheet S4 is calculated according to the output information on the sheet S1 and the image information on the sheets S2 and S3, as well as the correction amounts of the sheets S5 and S6 are calculated by using at least one of the output information on the sheets S2 and S3 and the correction amount of the sheet S4. Thus, it is possible to utilize the information used for the correction of the output image without insufficiency and thus highly accurately correct the output image.

Furthermore, since the correction amount of the output image is calculated by using the application ratio of the provisional correction amount calculated based on the output information on the sheets S1, S2 and S3, it is easier to make the correction amount an appropriate amount. Therefore, the efficiency of the correction processing of the output image can be improved.

Further, since the application ratio is determined based on the reliability set according to the image information, the correction amount of the output image can be calculated with priority on the image information with high reliability.

Note that the correction related to the single color of the output image has been exemplified in the above embodiments, but the present invention is not limited thereto, and, for example, correction related to the mixed color of the output image may be performed similarly.

Moreover, the application ratio is used for the calculation of the correction amount in order to apply the one with relatively low reliability to the correction in the above embodiments, but the present invention is not limited thereto. For example, only the one with the highest reliability may be used for the calculation of the correction amount.

Furthermore, the above embodiments are configured to add the correction amount to the set value of the developing bias or the like that has been originally set, but the present invention is not limited thereto, and the embodiments may be configured to directly change the set value.

Although embodiments of the present invention have been described and illustrated in detail, the disclosed embodiments are made for purposes of illustration and example only and not limitation. The scope of the present invention should be interpreted by terms of the appended claims. That is, the present invention can be carried out in various forms without departing from the gist or the main features thereof.

What is claimed is:

1. An image forming apparatus comprising:
   an image former that forms an image, which is desired by a user and different from a predetermined pattern, on a sheet;
   an output information detector that detects output information on a first image formed on a first sheet by the image former; and
   a hardware processor that: acquires a correction amount of a third image, which is formed on a third sheet after the first sheet and a second sheet, according to an application ratio and a detection result of the first image by the output information detector, wherein the application ratio is based on image information that forms a second image formed on the second sheet after the first sheet by the image former; and
   controls the image former so as to correct the third image based on the correction amount acquired by the hardware processor.

2. The image forming apparatus according to claim 1, wherein the output information detector detects output information on the second image formed on the second sheet, and
   the hardware processor acquires a correction amount of a fourth image, which is formed on a fourth sheet after the third sheet, by using at least one of a detection result of the second image by the output information detector and the correction amount of the third image.

3. The image forming apparatus according to claim 1, wherein an image is formed on the third sheet after a predetermined number of sheets from the first sheet, and
   the hardware processor performs control to change the predetermined number of the sheets according to a print processing condition.

4. An image forming apparatus comprising:
   an image former that forms an image, which is desired by a user and different from a predetermined pattern, on a sheet;
   an output information detector that detects output information on a first image formed on a first sheet by the image former, and detects output information on the second image formed on the second sheet; and
   a hardware processor that:
   acquires a correction amount of a third image, which is formed on a third sheet after the first sheet and a second sheet, according to a detection result of the first image by the output information detector and image information that forms a second image formed on the second sheet after the first sheet by the image former;
   acquires a correction amount of a fourth image, which is formed on a fourth sheet after the third sheet, by using at least one of a detection result of the second image by the output information detector and the correction amount of the third image;

acquires a provisional correction amount of the third image based on the output information on the first image and acquires a provisional correction amount of the fourth image based on the output information on the second image, determines an application ratio of each provisional correction amount based on image information on the first image and the image information that forms the second image, and acquires the correction amount of the third image and the correction amount of the fourth image based on each application ratio and each provisional correction amount; and controls the image former so as to correct the third image based on the correction amounts acquired by the hardware processor.

5. The image forming apparatus according to claim 4, wherein the hardware processor sets reliability for each image information based on the image information on the first image and the image information that forms the second image, and the application ratio of the provisional correction amount acquired based on an image with higher reliability is set to be greater than the application ratio of the provisional correction amount acquired based on an image with lower reliability for each reliability.

6. The image forming apparatus according to claim 5, wherein the reliability set for the image information on the first image including image information on only a specific color is higher than the reliability set for image information that forms the second image, which includes image information on a mixed color obtained by mixing a plurality of colors including the specific color and does not includes the image information on only the specific color.

7. The image forming apparatus according to claim 5, wherein the reliability is set to be lower as a number of pixels included in the image information is smaller.

8. The image forming apparatus according to claim 5, wherein the reliability is set to be lower as a degree of dispersion of a plurality of pixels included in the image information is smaller.

9. A non-transitory recording medium storing a computer readable correction control program for an image forming apparatus comprising an image former that forms an image, which is desired by a user and different from a predetermined pattern, on a sheet, the program causing a computer to perform:

detecting output information on a first image formed on a first sheet by the image former;

acquiring a correction amount of a third image, which is formed on a third sheet after the first sheet and a second sheet, according to an application ratio and a detection result of the first image, wherein the application is based on image information that forms a second image formed on the second sheet after the first sheet by the image former; and controlling the image former so as to correct the third image based on the correction amount acquired.

* * * * *